(12) United States Patent
Segawa et al.

(10) Patent No.: US 6,776,582 B2
(45) Date of Patent: Aug. 17, 2004

(54) TURBINE BLADE AND TURBINE

(75) Inventors: Kiyoshi Segawa, Hitachi (JP); Yoshio Shikano, Hitachinaka (JP); Yoshiaki Yamazaki, Hitachi (JP); Shigeki Senoo, Hitachi (JP); Yoshiharu Nakayama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 73 days.

(21) Appl. No.: 10/079,862

(22) Filed: Feb. 22, 2002

(65) Prior Publication Data

US 2002/0172594 A1 Nov. 21, 2002

(30) Foreign Application Priority Data

May 18, 2001 (JP) .................................... 2001-148606

(51) Int. Cl.[7] ................................................ F01D 5/14
(52) U.S. Cl. .......................... 416/223 R; 416/DIG. 2
(58) Field of Search ............................... 415/191, 192, 415/208.1; 416/223 R, DIG. 2

(56) References Cited

U.S. PATENT DOCUMENTS

| | | | |
|---|---|---|---|
| 5,292,230 A | 3/1994 | Brown | 416/223 A |
| 5,480,285 A | 1/1996 | Patel et al. | 416/223 A |
| 6,491,493 B1 * | 12/2002 | Watanabe et al. | 415/191 |

FOREIGN PATENT DOCUMENTS

| | | |
|---|---|---|
| JP | 61-232302 | 10/1986 |
| JP | 5-187202 | 7/1993 |
| JP | 2000-345801 | 12/2000 |

OTHER PUBLICATIONS

N. Madavan et al, "Redesigning Gas–Generator Turbines for Improved Unsteady Aerodynamic Performance Using Neural Networks", May–Jun. 2001, vol. 17, No. 3, pp. 669–677.
M. Rai et al, "Navier–Stokes Analyses of the Redistribution of Inlet Temperature Distortions in a Turbine", May/Jun. 1990, vol. 6, No. 3, pp. 276–282.
K. Rao et al, "Vane–Blade Interaction in a Transonic Turbine, Part I: Aerodynamics", May/Jun. 1994, vol. 10, No. 3, pp. 305–311.
A. Arnone et al, "Multigrid Calculation of Three–Dimensional Viscous Cascade Flows", Jul.–Aug. 1993, vol. 9, No. 4, pp. 605–614.

* cited by examiner

*Primary Examiner*—Edward K. Look
*Assistant Examiner*—Dwayne J. White
(74) *Attorney, Agent, or Firm*—Mattingly Stanger & Malur, P.C.

(57) ABSTRACT

A turbine moving blade operated by a working fluid and having a blade profile formed so that a pressure distribution curve defined by a pressure on a blade surface of a suction side of the moving blade drops in two stages in an area from a leading edge to a minimum pressure point.

10 Claims, 5 Drawing Sheets

MAX. BLADE LOADING POSTION ( Xn / Cax )

TURBINE BLADE AND TURBINE

BACKGROUND OF THE INVENTION

1. Field of the Invention

The present invention relates to a moving blade for use in a steam turbine, gas turbine or the like.

2. Description of Prior Arts

It is possible to save energy resources and reduce emission of carbon dioxide and so forth by suppressing a blade profile loss and a secondary flow loss generated in a turbine blade thereby increasing the internal efficiency in a turbine stage.

The well-known prior art to reduce such a turbine moving blade loss has been disclosed, for example, in JP A No. 61-232302, JP A No. 05-187202 and JP A No. 2000-345801.

The above-mentioned JP A No. 61-232302 discloses a blade profile related to a turbine cascade for use in a jet engine or a gas turbine engine and having so-called "FORE-LOADED" type velocity distribution (pressure distribution) wherein the blade profile is made in blunt nose type to increase a load per one blade and as means for reducing aerodynamic losses, the blade suction side maximum velocity point of the velocity distribution and the blade pressure side minimum velocity point are positioned at predetermined locations within a range where SX/SO is from 0.2 to 0.3, which is the respective ratios of the blade surface distance SX from a stagnation point of the leading edge along respective surfaces of the blade suction and blade pressure sides to the entire blade surface length SO from a stagnation point of the leading edge to the trailing edge along respective surfaces of the blade suction and blade pressure sides.

Further, the above-mentioned JP A No. 05-187202 discloses a blade of the turbo-machinery subject to a subsonic state, wherein the blade profile is formed such that a trailing edge portion on the blade suction side is made concave so as to suppress the momentum loss thickness in the trailing edge portion and decrease a blade profile loss.

Furthermore, the above-mentioned JP A No. 2000-345801 discloses a turbine moving blade which is formed such that it is FORE-LOADED or mid-loaded type on the inner-ring side and is AFT-LOADED type on the outer-ring side.

SUMMARY OF THE INVENTION

Generally, turbine stages can be classified into impulse stages and reaction stages according to the blade root reaction degree. Here, the ratio of a heat drop (variation of enthalpy) in a moving blade to a total heat drop in a turbine stage is called the degree of reaction, and the blade root reaction degree of the former stage is 0% and that of the latter stage is 50%. However, it is difficult to strictly classify actual turbine stages in such a manner. Accordingly, thereafter in the following description, a turbine stage with a blade root reaction degree of from 5 to 10% is called an impulse stage, a turbine stage with a blade root reaction degree of nearly 50% is called a reaction stage and a turbine stage with an intermediate blade root reaction degree of over 10 and less than 50% is called low-reaction type or a low-reaction stage (thereafter, referred to as "low-reaction stage").

As the degree of reaction at the root approximates to 0%, a turning angle of the turbine moving blade profile increases. As a result, it is necessary to increase the curvature of the blade suction side. Further, in the blade profile in which a maximum blade loading location is located on the leading edge side (FORE-LOADED), a decelerated flow (adverse pressure gradient) area extending from the blade suction side maximum velocity point (minimum pressure point) of the velocity distribution toward the trailing edge becomes relatively long, which makes the boundary layer grow, increasing the thickness of the boundary layer at the end of the trailing edge, thus causing a friction loss. If such a cascade is specifically applied to an impulse stage or a low-reaction stage of a moving blade, a flow cannot catch up with the large curvature of the blade suction side, which may result in the flow being separated and causing an excessive loss.

Furthermore, since a secondary flow results from a pressure difference between the blade suction side and the blade pressure side, the further out on the leading edge side a maximum blade loading position is, the earlier a secondary flow vortex starts to grow, which tends to increase the secondary flow loss.

The shape of a blade has a close relationship with the stage reaction degree. Specifically, the degree of reaction has a great effect on the blade turning angle (camber). The optimum blade loading distribution shape that minimizes a blade profile loss is considered to exist in accordance with the blade turning angle. It is generally known that a blade having a maximum blade load on its trailing edge side (AFT-LOADED) rather than on its leading edge side has less blade profile loss because the accelerated flow area on the suction-side blade surface is enlarged thereby suppressing the growth of the boundary layer. Furthermore, from the aspect of the secondary flow suppression, employing a blade having a maximum blade load on its trailing edge side reduces the secondary flow loss, which makes it possible to lower both blade profile and secondary flow losses.

When designing such a blade profile, however, a blade surface pressure distribution which minimizes a loss, the shape of a blade loading distribution, and the division rate of the blade load are unknown. The above-mentioned prior art does not take such points into consideration. Specifically, the blade profile turning angle of a moving blade root portion in an impulse stage and a low-reaction stage for a steam turbine is set to be approximately 110 degrees or more. This is larger than approximately 80 degrees, the turning angle of a moving blade in a reaction stage. As a result, not only the blade profile loss but also the secondary flow loss ends up contributing to a major loss among stage losses.

In view of the foregoing, an object of the present invention is to provide a turbine moving blade capable of reducing aerodynamic losses, such as a blade profile loss and a secondary flow loss.

To achieve the above-mentioned object, the present invention provides a turbine moving blade operated by working fluid, wherein a blade profile is formed such that the pressure distribution defined by the suction-side surface pressure of the moving blade drops in two stages in the area from the leading edge to the minimum pressure point.

DESCRIPTION OF THE PREFERRED EMBODIMENTS

A turbine moving blade which is an embodiment of the present invention will be described below with reference to the accompanying drawings. A turbine moving blade according to the present invention is applicable to a steam turbine, gas turbine or the like. In the following description, a turbine moving blade for use in a steam turbine will be used as an example.

Figure 1:
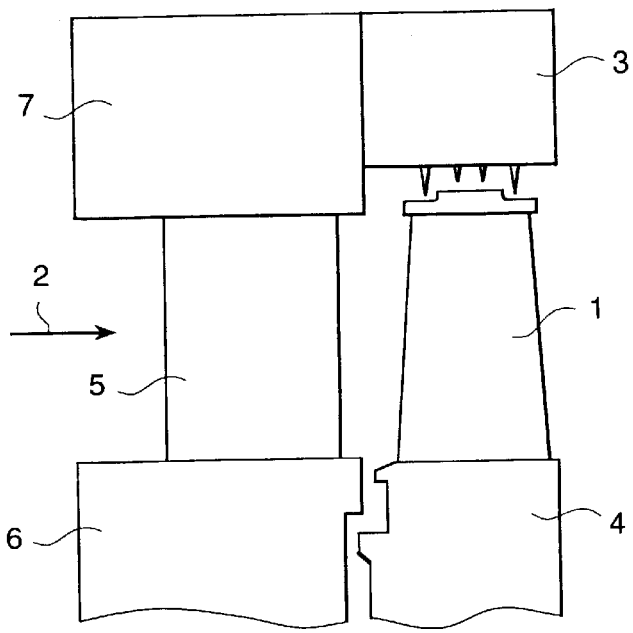
FIG. 1 is a schematic drawing showing a transverse cross section of a turbine moving blade of this embodiment.

FIG. 1 is a transverse cross-sectional view of a turbine moving blade in this embodiment. In the drawing, there are shown a moving blade 1, steam 2, a fixing part 3 which supports the sealing structure of a moving blade tip portion, a disk 4 which fixes the moving blade 1 to a rotor, a stationary blade (nozzle) 5 which induces the steam 2 to the moving blade 1, an annular inner ring 6 which cramps an inside edge portion of the stationary blade 5, and an annular outer ring 7 which fixes an outside edge portion of the stationary blade 5 to a casing. A plurality of moving blades 1 are disposed with respect to the circumferential direction (rotational direction) of the rotor. A plurality of stationary blades 5 are disposed on the upstream side of the moving blades 1. This combination of the moving blade 1 and the stationary blade 5 is called a "turbine stage". A plurality of turbine stages are disposed with respect to the axial direction of the rotor. In each section of a steam turbine, the height of the moving blade 1 is made longer the further the blades are downstream of the steam 2 flow. Steam 2 induced by the stationary blade 5 rotates the rotor via the moving blade 1. A power generator, not shown, provided at the end portion of the rotor generates power by converting rotation energy into electric energy.

Figure 2:
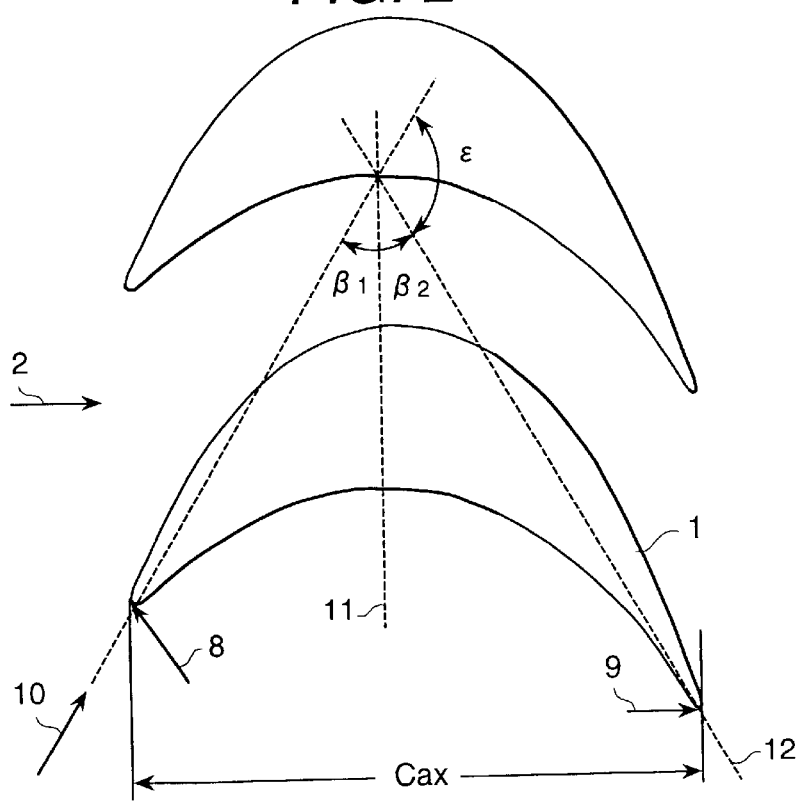
FIG. 2 is a cross-sectional view of a turbine cascade of this embodiment.

FIG. 2 is a cross-sectional view of a turbine moving blade of this embodiment. In the drawing, there are shown a leading edge 8 located at the most upstream position with respect to the steam 2 in each cross section of a blade profile for the moving blade 1, a trailing edge 9 located at the most downstream position with respect to steam 2 in each cross section of a blade profile for the moving blade 1, a tangent 10 to a camber line at the leading edge 8, a cascade axis 11 (circumferential direction line of the rotor), a tangent 12 to a camber line at the trailing edge 9, and Cax indicating the blade axial chord. Further, a borderline of the blade profile can be plotted by an envelope formed by a plurality of circles provided in a row from the leading edge to the trailing edge. A camber line is a line connecting respective centers of the circles and is also a center line of the cross section of the blade profile. The moving blade 1 from its blade root to its blade tip may be twisted or may not have to be twisted. Furthermore, the shape of the blade profile cross section from its blade root to its blade tip may be the same or may be different. Here, if an angle formed by the tangent 10 and the blade cascade axis 11(blade inlet angle) is denoted as $\beta_1$, and an angle formed by the tangent 12 and the blade cascade axis 11 (blade outlet angle) is denoted as $\beta_2$, a turning angle $\epsilon$ can be expressed by the equation, $\epsilon=180-(\beta_1+\beta_2)$.

Figure 3:
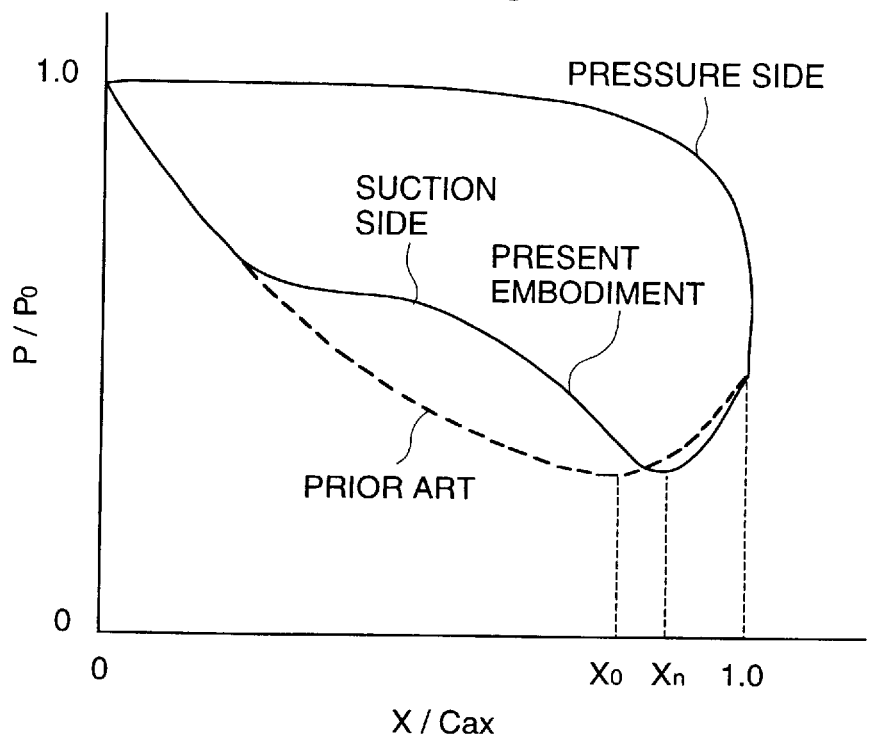
FIG. 3 is a schematic drawing that shows surface pressure distributions of the blade according to this embodiment and a conventional embodiment.

FIG. 3 is a schematic drawing of the blade surface static pressure distribution of this embodiment showing together with that of a typical conventional embodiment. Further, the vertical axis shows the value of the blade surface static pressure P normalized by the inlet total pressure $P_o$, and the horizontal axis shows the value of respective positions X in the blade surface axial direction from the leading edge which is rendered dimensionless by the blade axial chord Cax. Furthermore, in the drawing, a continuous line shows the blade surface static pressure distribution of this embodiment, and a broken line shows that of the conventional embodiment. In the conventional embodiment, it is shown that the maximum blade load is located on the trailing edge side (AFT-LOADED).

Moreover, in FIG. 3, although the blade pressure-side pressure distribution of this embodiment coincides with that of the conventional embodiment, neither of the distributions have to coincide with each other because this embodiment mainly targets the blade suction-side pressure distribution which greatly relates to the cascade performance. Furthermore, the closed curves plotted by the continuous line and the broken line, respectively, are divided at the points where X/Cax=0 and 1.0. In the drawing, the approximately upper side of the curves shows the blade pressure-side pressure distribution and the approximately lower side of the curves shows the blade suction-side pressure distribution. Xo and Xn showing the blade surface positions in the axial direction are the minimum points of the blade suction-side pressure distribution in the conventional embodiment and this embodiment, respectively. Moreover, the shape of the pressure distribution described in this embodiment excludes an area in which the pressure in the vicinity of the leading edge and the trailing edge rapidly changes in such a case that an incidence angle is provided (off-design point and so forth).

As shown in FIG. 3, in the conventional embodiment, the blade suction-side pressure distribution monotonically decreases toward the minimum pressure point Xo, and when the maximum blade load is located on the trailing edge side, the minimum pressure point is usually located at a position where Xo/Cax=0.7 to 0.8. On the other hand, in this embodiment, the blade profile is formed such that the pressure drops in two stages in the area from the leading edge to the minimum pressure point Xn, and the minimum pressure point Xn is positioned further out on the trailing edge side than the minimum pressure point Xo in the conventional embodiment.

Figure 4:
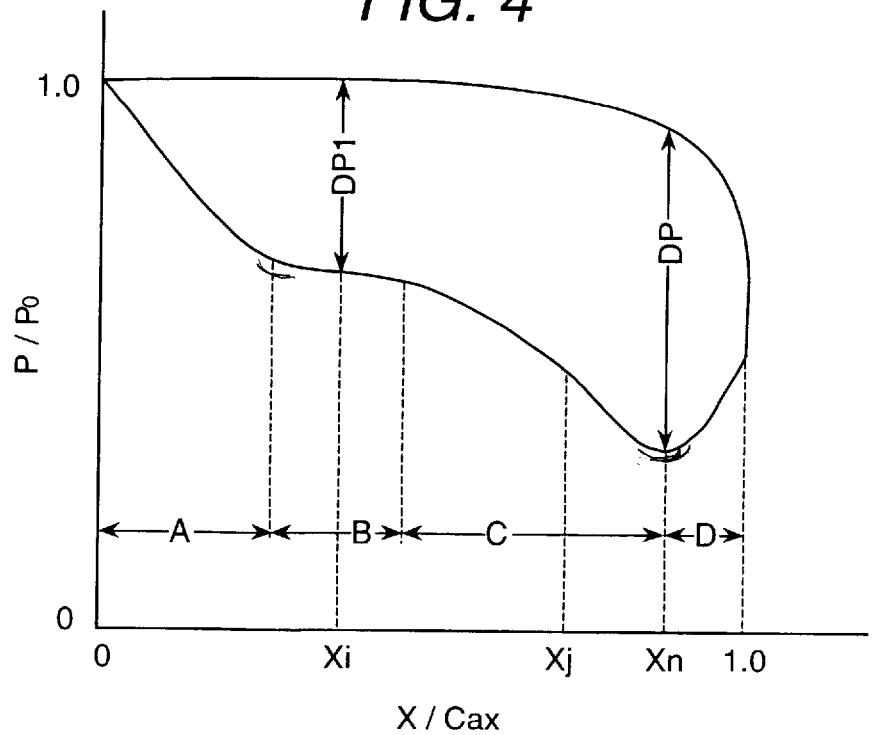
FIG. 4 is a schematic drawing of the surface pressure distribution of the blade according to this embodiment.

Next, this embodiment will be described in detail with reference to FIG. 4. FIG. 4 is a schematic drawing that shows the blade surface pressure distribution of this embodiment. In this embodiment, as shown in the drawing, the blade suction-side pressure distribution can be divided into four areas: A to D. First, from the aspect of a pressure drop from the leading edge to the minimum pressure point Xn, there are areas A and C in which the pressure greatly drops, and between the areas A and C, there is area B in which a moderate pressure gradient exists. This is the reason for the two-stage pressure drop mechanism. That is, in this embodiment, the blade profile of a moving blade is formed such that the first-stage pressure drop occurs in area A and after the pressure drop gradient becomes moderate in area B, the second-stage pressure drop occurs in area C. Further, inflection points of the pressure gradient are positioned in areas B and C, i.e., an inflection point Xi on the leading edge side and an inflection point Xj on the trailing edge side, respectively. Finally, area D shows the adverse pressure gradient from the minimum pressure point Xn to the trailing edge.

Generally, as shown in the drawing, the blade pressure-side pressure distribution is shaped such that the pressure does not differ much from the inlet pressure but rapidly drops to the level of the outlet pressure near the trailing edge. Accordingly, most of the blade load on a blade is applied on a pressure drop on the blade suction side. That is, this pressure drop accelerates the velocity of working fluid, such as air or steam, for turbines. In the conventional embodiment, a blade profile is formed such that the velocity of working fluid is accelerated at a sitting from the leading edge portion of the moving blade to the minimum pressure point Xo.

On the other hand, in this embodiment, the blade load is divided into two portions. A flow is first accelerated to some extent in area A, and then the pressure drop gradient is made moderate in area B so that the acceleration does not finish at a sitting and the flow is not excessively accelerated, and then, the flow is again accelerated in area C toward the minimum pressure point Xn. If the division rate of the blade load is expressed by the ratio of a pressure difference DP1 between the blade suction side and the blade pressure side at the inflection point Xi on the leading edge side to a pressure difference DP between the blade suction side and the blade pressure side at the minimum pressure point Xn, this embodiment is most effective when DP1/DP=0.55±0.05.

By employing the pressure distribution as described above, it is possible to effectively suppress the growth of the boundary layer with respect to the cross section of the blade having a relatively large turning angle, such as moving blades in an impulse stage and a low-reaction stage for a steam turbine. Furthermore, this embodiment also makes it possible to suppress the growth of a secondary flow vortex because the pressure on the blade suction-side center portion where the horseshoe-shaped vortices collide with each other is higher than that of the conventional case wherein a pressure drops in a single stage (monotonic pressure decrease).

This embodiment is most effective when the inflection point Xi in area B is positioned in the neighborhood of Xi/Cax=0.4 to 0.45. Further, this embodiment is most effective when the minimum pressure point Xn is positioned in the neighborhood of Xn/Cax=0.8 to 0.9, specifically around 0.9. Moreover, in FIG. 3 and FIG. 4, the pressure gradient in area B of this embodiment is to be more moderate than that in areas A and C, or it can be flat. Although if the pressure gradient in area B is flat, there is a possibility that a boundary layer may grow in the neighborhood, it is possible to suppress the growth of the boundary layer by decreasing the pressure again in area C which follows area B to accelerate the velocity of the working fluid. Accordingly, the blade cascade performance is not affected.

Further, it is also possible to suppress the growth of the boundary layer by approximating the inflection point Xj on the trailing edge side located in area C to the minimum pressure point Xn so as to cause the pressure gradient immediately before Xn to become steep. Since the minimum pressure point Xn in this embodiment is positioned further out on the trailing edge side than the minimum pressure point Xo in the conventional embodiment, the adverse pressure gradient is large in area D as shown in FIG. 4, however, since the distance from the minimum pressure point Xn to the trailing edge is short, there is no great effect on the growth of the boundary layer due to separation and so forth.

Figure 5:
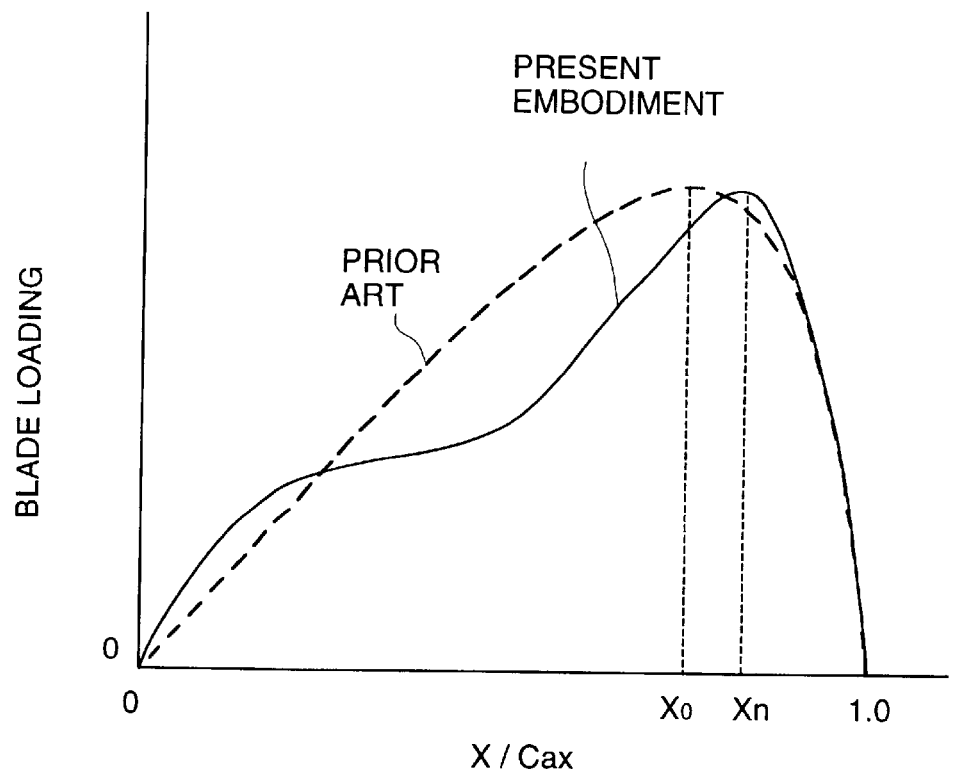
FIG. 5 is a schematic drawing that shows blade load distributions of the blade according to this embodiment and a conventional embodiment.
Figure 6:
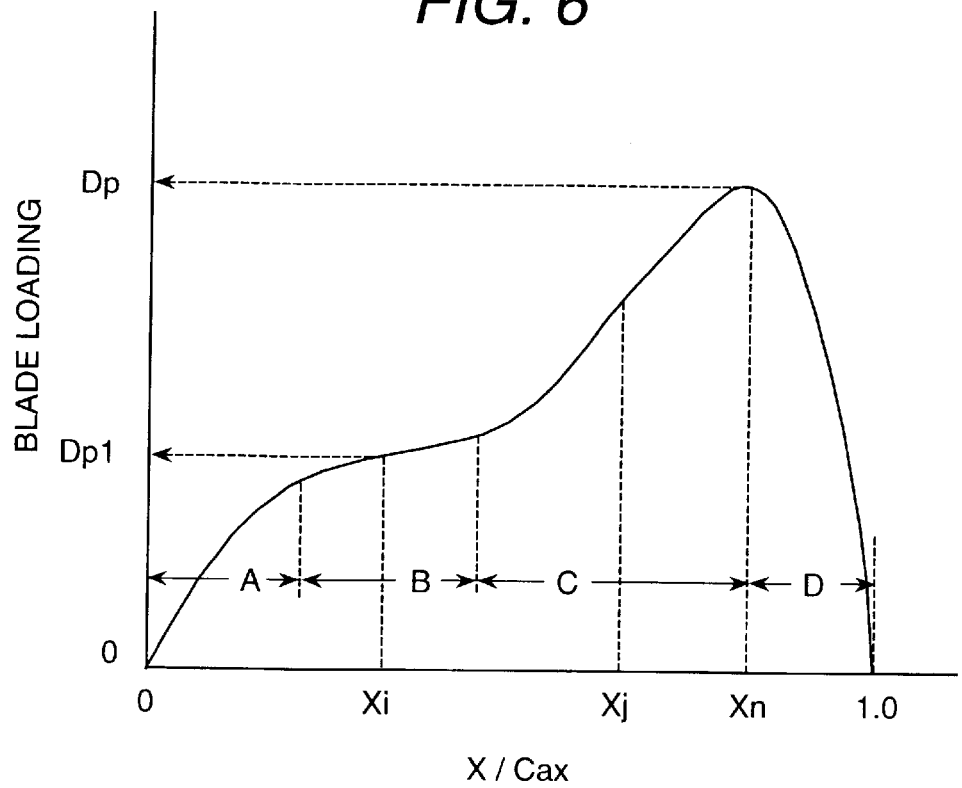
FIG. 6 is a schematic drawing of the blade load distribution of the blade according to this embodiment.

FIG. 5 and FIG. 6 are schematic drawings which compare the blade of this embodiment (with that of a conventional embodiment) from the aspect of the blade loading distribution. These drawings correspond to the blade surface pressure distributions shown in FIG. 3 and FIG. 4, respectively. Since the blade load is equivalent to a pressure difference between the pressure side and the suction side of the pressure distribution curve, in most cases, the blade load distribution directly reflects the pressure distribution on the blade suction side (the distribution shape becomes upside down). The vertical axis shows the blade load and the horizontal axis shows the value of respective blade surface positions X in the axial direction from the leading edge which is rendered dimensionless by the blade axial chord Cax. In the drawing, a continuous line shows this embodiment and a broken line shows the conventional embodiment. In the conventional embodiment, it is shown that the maximum blade load is located on the trailing edge side. Xo and Xn are maximum blade load positions in the conventional embodiment and in this embodiment, respectively. Moreover, the shape of the pressure distribution described in this embodiment excludes an area in which the pressure in the vicinity of the leading edge and the trailing edge rapidly changes in such a case that an incidence angle is provided (off-design point and so forth).

According to the conventional embodiment, the blade loading distribution monotonically increases toward the maximum blade load position Xo and the maximum blade load position is usually located at a position where Xo/Cax= 0.7 to 0.8 when the maximum blade load is located on the trailing edge side. On the contrary, in this embodiment, the blade load is divided into two portions in the area from the leading edge to the maximum blade load position Xn, and the maximum blade load position is located further out on the trailing edge side than the maximum blade load position Xo in the conventional embodiment.

Now, the blade load distribution of this embodiment will be described with reference to FIG. 6. If the blade load distribution is divided into four areas A to D in the same manner as described with regard to FIG. 4, first, in the area from the leading edge to the maximum blade load position Xn, there are areas A and C in which the blade load greatly increases, and between the areas A and C, there is area B in which the blade load slowly increases. Inflection points are positioned in areas B and C, i.e., an inflection point Xi on the leading edge side and an inflection point Xj on the trailing edge side, respectively.

In the same manner as described with regard to FIG. 4, in a conventional embodiment, the blade load is applied to accelerate a flow at a sitting, while in this embodiment, the blade load is divided into two portions. A flow is first accelerated to some extent in area A, and then in area B, it is controlled such that the acceleration does not finish at a sitting and the flow is not excessively accelerated, and finally the flow is accelerated toward the maximum blade load position Xn. In FIG. 6 as well, if the division rate of the blade load is expressed by the ratio of a blade load DP1 at the inflection point Xi on the leading edge side to a maximum blade load DP, this embodiment is most effective when DP1/DP=0.55±0.05. Thus, the same effect as that of FIG. 4 can be obtained.

Similar to FIG. 4, this embodiment is most effective when the inflection point Xi on the leading edge side, which divides the blade load into two portions, is positioned in the neighborhood of Xi/Cax=0.4 to 0.45. Further, this embodiment is most effective when the maximum blade load position Xn is located in the neighborhood of Xn/Cax=0.8 to 0.9, specifically around 0.9. Moreover, in FIG. 5 and FIG. 6, the pressure gradient in area B of this embodiment is to be more moderate than that in areas A and C area, or it can be flat. By approximating the inflection point Xj on the trailing edge side in area C to the maximum blade load position Xn thereby causing the blade load gradient immediately before Xn to become steep, it is possible to suppress the growth of the boundary layer, thus making this embodiment more effective. In this embodiment, as described with regard to FIG. 4, an increase in the adverse pressure gradient in area D will not affect the boundary layer.

Figure 7:
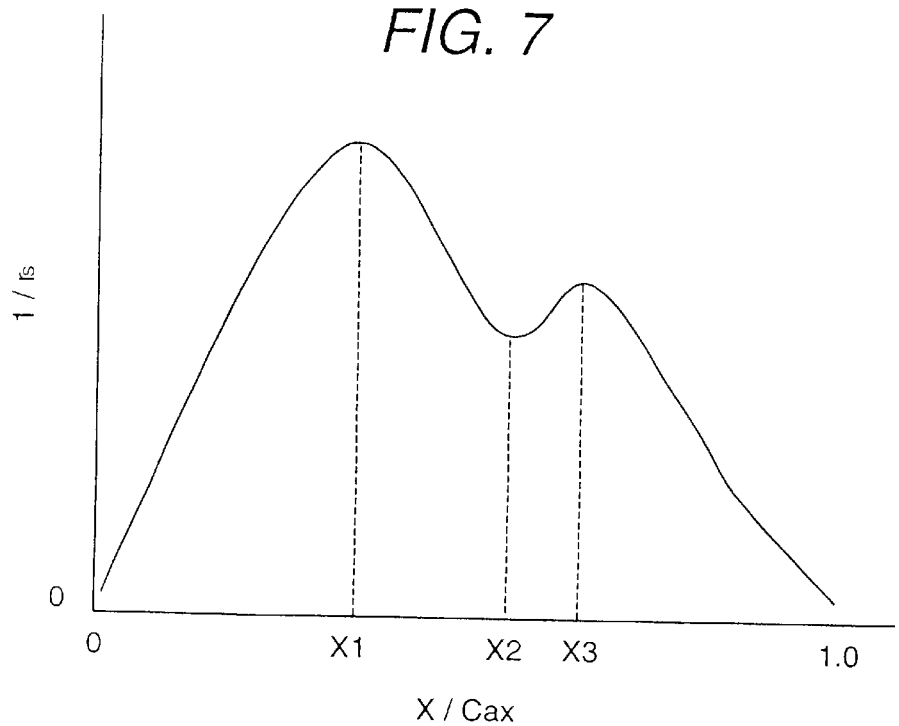
FIG. 7 is a schematic drawing of the blade suction side curvature distribution of the blade according to this embodiment.

Next, embodiments described with reference to FIG. 3 through FIG. 6 will be described by using parameters that indicate the shape of the blade profile. FIG. 7 shows the curvature of the suction-side shape of the blade according to this embodiment. The vertical axis shows the inverse of the radius of curvature rs, i.e., curvature, and the horizontal axis shows the value of respective blade surface positions X in the axial direction from the leading edge which is rendered dimensionless by the blade axial chord Cax. In this embodiment, the blade suction-side shape curvature distribution has two maximums X1, X3 and a minimum X2. When the curvature maximums X1, X3 are positioned at locations where X1/Cax=0.3 to 0.35 and X3/Cax=0.65 to 0.7, respectively, this embodiment is most effective. Further, when the curvature minimum X2 is positioned at the location where X2/Cax=0.55 to 0.6, this embodiment is most effective.

Figure 8:
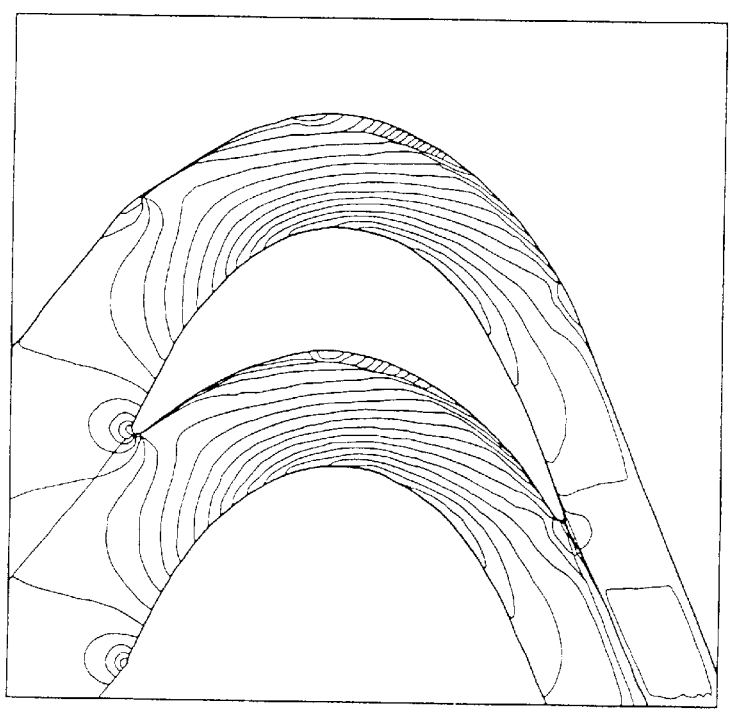
FIG. 8 is a contour map for the Iso-Mach number of the turbine cascade according to a conventional embodiment.
Figure 9:
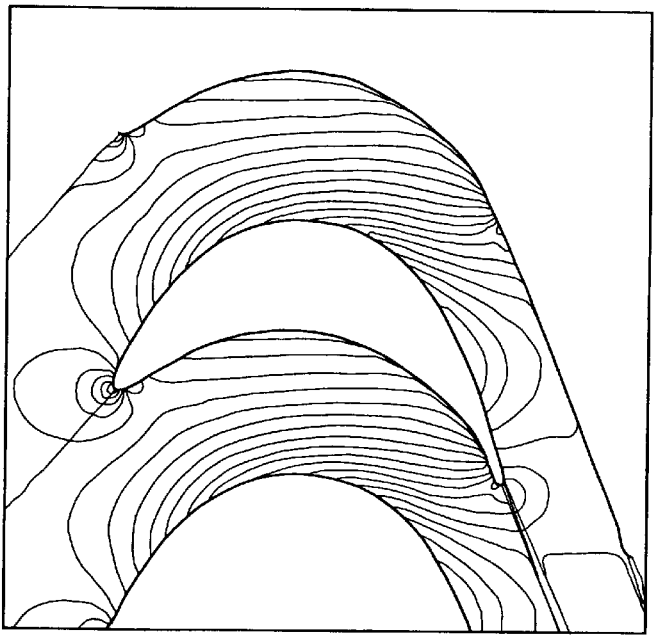
FIG. 9 is a contour map for the Iso-Mach number of the turbine cascade according to this embodiment.

FIG. 8 and FIG. 9 show the Iso-Mach number contour maps based on the two-dimensional turbulent flow analysis of a cascade of moving blade for a steam turbine according to the conventional embodiment and this embodiment, respectively. The increment for the Mach number is 0.02. This embodiment is formed such that the maximum Mach number on the suction-side blade surface is positioned at the location where Xn/Cax=0.9 and the maximum blade load position is located further out on the trailing edge side comparing to the conventional embodiment. The velocity boundary layer corresponds to the area in which contour lines concentrate near the blade profile boundary (blade surface) in the Iso-Mach number contour map, and the thickness of the concentration is almost equivalent to that of the velocity boundary layer.

In this embodiment, as shown in FIG. 9, the growth of the boundary layer from the maximum Mach number position of the blade surface to the trailing edge is suppressed, and the thickness of the boundary layer at the trailing edge is thinner than that of the conventional embodiment. In this embodiment, a blade profile loss is lowered by approximately 40% than that in the conventional embodiment. Furthermore, as shown in FIG. 3, the adverse pressure gradient from the maximum point of the blade surface Mach number (the minimum pressure point on the suction side) to the trailing edge is larger, however, as understood from FIG. 9, neither quick growth of the boundary layer nor effect of separation can be seen.

Figure 10:
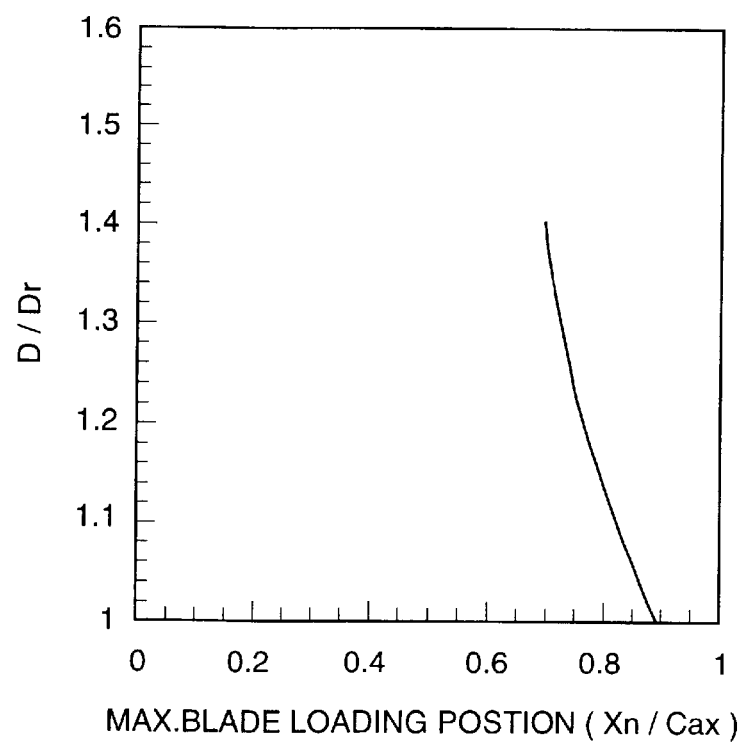
FIG. 10 is an embodiment of a turbine moving blade according to this embodiment.

FIG. 10 shows the application of this embodiment to a turbine moving blade. The vertical axis shows the ratio (D/Dr) of the diameter D at the blade height position to the diameter Dr of the blade root and the horizontal axis shows the position of the maximum blade load. This embodiment is formed such that the maximum blade load position Xn is located in the neighborhood of Xn/Cax=0.9 with regard to the neighborhood of the blade root portion, and toward the blade tip from the blade root, the maximum blade load position shifts in the leading edge direction. The larger the ratio D/Dr becomes, the closer the position of the suction-side blade throat comes to the position of the blade profile maximum height (moving to the upstream side), which makes the distance between the suction-side blade throat portion and the trailing edge long. Since the boundary layer tends to grow in this area, by arranging the maximum blade load position on the trailing edge side as shown in this embodiment, it is possible to enlarge the accelerating area on the blade surface thereby suppressing the growth of the boundary layer. In this embodiment, it is preferable for the maximum blade load position Xn of the tip blade profile to be positioned at a location Xn/Cax=0.7 to 0.8.

As shown in FIG. 10, in this embodiment, the entire section of a turbine blade from its blade root to its blade tip is formed such that the blade load is located on the trailing edge side and particularly in the neighborhood of the blade root, the blade load is located further out on the trailing edge side by taking the reduction of a secondary flow loss into consideration. A turbine moving blade disclosed in said Japanese Application Patent Laid-Open Publication No. 2000-345801 is formed such that it is fore-loaded or mid-loaded type on the inner-ring side and is aft-loaded type on the outer-ring side, and the shape of the load distribution in the neighborhood of the blade root and the load distribution in the blade height direction are completely different from those in this embodiment.

Further, in the prior art disclosed in the above-mentioned JP A No. 61-232302, if the distribution curve is replaced with a pressure distribution curve, the blade suction-side minimum pressure point and the blade pressure-side maximum pressure point of the pressure distribution curve are also positioned at predetermined positions in a range where ratio SX/SO is 0.2 to 0.3. Furthermore, if this is expressed by a blade loading distribution curve (the blade load indicates a pressure difference between the pressure side and the suction side of the pressure distribution curve), the prior art is fore-loaded type having a maximum blade load within the similar range. The blade suction-side pressure distribution of this prior art monotonically decreases to the minimum pressure point except for the leading edge neighborhood (monotonic increase in the Mach number distribution). Therefore, the position of the maximum blade load and the shape of the blade suction-side pressure distribution are different from those in this embodiment.

Furthermore, in the prior art disclosed in the above-mentioned No. 05-187202, the Mach number first greatly decreases from the blade suction-side maximum Mach number of the Mach number distribution curve toward the trailing edge and then the distribution curve becomes flat to the final value. If the distribution curve is replaced with a blade surface pressure distribution curve, the blade surface pressure first greatly increases from the blade suction-side minimum pressure point toward the trailing edge and then the distribution curve becomes flat to the final value. The blade suction-side pressure distribution monotonically decreases to the minimum pressure point except for the leading edge neighborhood (monotonic increase in the Mach number distribution).

It can be said that the area surrounded by the blade surface Mach number distribution curves of the pressure side and the suction side qualitatively express the blade load. Therefore, the position of the maximum blade load in this prior art is located at a position approximately 60% in the blade chord direction. Although the shape of the blade load distribution is not shown, it can be read that the blade load distribution monotonically increases to the maximum blade load position except for the leading edge neighborhood. Accordingly, the position of the maximum blade load and the shape of the blade suction-side pressure distribution in this conventional embodiment are different from this embodiment according to the present invention.

Air turbine testing conducted for a turbine moving blade according to this embodiment proved that the stage efficiency has increased by approximately 0.3% comparing to that of a conventional blade.

In the embodiments mentioned above, a moving blade for use in a steam turbine has been described as an example. Besides, this embodiment is also applicable to a moving blade of an axial-flow turbine, such as a gas turbine, and the same result can be obtained. Further, the above description has been made specifically with respect to the root portion of a moving blade in an impulse stage and a low-reaction stage for a steam turbine having a turning angle of approximately 110 degrees or more, in addition, the concept of this embodiment is applicable to other turning angles, e.g., the blade having a turning angle of 110 degrees or less in the blade height direction.

Moreover, this embodiment is also effective for not only a turbine moving blade in which the trailing edge line is linearly stacked when seen from the outlet side, but also for a three-dimensionally designed moving blade, which is called a bowed blade or a compound lean blade.

According to the present invention, it is possible to provide a turbine moving blade which exhibits low aerodynamic losses, such as a blade profile loss and a secondary flow loss.

What is claimed is:

1. A turbine moving blade operated by working fluid, wherein a blade profile is formed such that a pressure distribution curve defined by a pressure on the a blade surface of a suction side of the moving blade drops in two stages in an area from a leading edge to the a minimum pressure point.

2. A turbine moving blade according to claim 1, wherein said pressure distribution curve has two inflection points in a pressure drop area from the leading edge to the minimum pressure point.

3. A turbine moving blade according to claim 1, wherein a curvature distribution curve of a blade surface of a suction side, which excludes the leading edge portion, and a trailing edge portion of said blade has two curvature maximums.

4. A turbine moving blade having a maximum blade load point on a trailing edge side, wherein a blade profile is formed such that a pressure distribution curve of a blade surface of a suction side of the moving blade, excluding a leading edge portion, and a trailing edge portion drops in two stages in an area from the leading edge to a minimum pressure point.

5. A turbine moving blade operated by working fluid, wherein a blade profile is formed such that when a pressure distribution curve is defined by a pressure on a blade surface of a suction side of the moving blade, the pressure distribution curve has a first area in which a pressure drops from a leading edge of the moving blade to a first pressure point, a second area in which a pressure drops or maintains from said first pressure point to a second pressure point, and a third area in which a pressure drops from said second pressure point to a minimum pressure point.

6. A turbine moving blade according to claim 5, wherein said pressure distribution curve has first and second inflection points in a pressure drop area from the leading edge to the minimum pressure point, and said first inflection point is positioned in said second area and said second inflection point is positioned in said third area.

7. A turbine moving blade operated by working fluid, wherein a blade profile is formed such that a pressure distribution curve defined by a pressure on a blade surface of a suction side of the moving blade drops in two stages in an area from a leading edge to a minimum pressure point, said pressure distribution curve has two inflection points in a pressure drop area from the leading edge to the minimum pressure point; and when a blade surface axial location of the minimum pressure point with respect to the leading edge is denoted as Xn and a blade axial chord is denoted as Cax, a normalized value Xn/Cax is within a range from 0.8 to 0.9, and when the an inflection point on the leading edge side among said inflection points is denoted as Xi, a dimensionless value Xi/Cax is within a range from 0.4 to 0.45.

8. A turbine moving blade according to claim 7, wherein the a ratio of a pressure difference between the suction side and the pressure side of the blade at the inflection point on said leading edge side to a pressure difference between the suction side and the pressure side of the blade at said minimum pressure point is within a range of 0.55 ±0.05.

9. A turbine moving blade operated by working fluid, wherein when a blade loading distribution curve is defined by a blade load of each position on a blade surface of the moving blade, the area from a leading edge to a maximum blade load position of a curve portion of the blade loading distribution curve, excluding the leading edge portion, and a trailing edge portion is divided into two portions.

10. A turbine having a plurality of stationary blades and moving blades disposed in a rotor's circumferential direction whereby a cascade of said stationary blades and said moving blades forms a stage, wherein a blade profile of each said moving blade is formed such that a pressure distribution curve defined by a pressure of a blade surface of a suction side of said moving blade drops in two stages in an area from a leading edge to a minimum pressure point.

* * * * *

UNITED STATES PATENT AND TRADEMARK OFFICE
CERTIFICATE OF CORRECTION

PATENT NO. : 6,776,582 B2
DATED : August 17, 2004
INVENTOR(S) : K. Segawa et al.

It is certified that error appears in the above-identified patent and that said Letters Patent is hereby corrected as shown below:

<u>Column 9, line 41 through Column 10, line 53,</u>
Should read:
2. A turbine moving blade having a maximum blade load point on a trailing edge side, wherein a blade profile is formed such that a pressure distribution curve of a blade surface of a suction side of the moving blade, excluding a leading edge portion, and a trailing edge portion drops in two stages in an area from the leading edge to a minimum pressure point.

8. A turbine moving blade operated by working fluid, weherein when a blade loading distribution curve is defined by a blade load of each position on a blade surface of the moving blade, the area from a leading edge to a maximum blade load position of a curve portion of the blade loading distribution curve, excluding the leading edge portion, and a trailing edge portion is divided into two portions.

9. A turbine moving blade according to Claim 1, wherein a curvature distribution curve of a blade surface of a suction side, which excludes the leading edge portion, and a trailing edge portion of said blade has two curvature maximums.

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,776,582 B2
DATED : August 17, 2004
INVENTOR(S) : Kiyoshi Segawa et al.

It is certified that error appears in the above-identified patent and that said Letters Patent is hereby corrected as shown below:

Column 9,
Lines 45-48, should read:
3.   A turbine moving blade according to claim 1, wherein a curvature distribution curve of a blade surface of a suction side, which excludes the leading edge portion and a trailing edge portion of said blade, has two curvature maximums.
Lines 49-55, should read:
4.   A turbine moving blade having a maximum blade load point on a trailing edge side, wherein a blade profile is formed such that a pressure distribution curve of a blade surface of a suction side of the trailing edge portion, drops in two stages in an area from the leading edge to a minimum pressure point.

Column 10,
Lines 39-45, should read:
9.   A turbine blade operated by working fluid, wherein when a blade loading distribution curve is defined by a blade load of each position on a blade surface of the moving blade, the area from a leading edge to a maximum blade load position of a curve portion of the blade loading distribution curve, excluding the leading edge portion and a trailing edge portion, is divided into two portions.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO.    : 6,776,582 B2
DATED         : August 17, 2004
INVENTOR(S)   : Kiyoshi Segawa et al.

It is certified that error appears in the above-identified patent and that said Letters Patent is hereby corrected as shown below:

Column 9,
Lines 45-48, should read:
3.    A turbine moving blade according to claim 1, wherein a curvature distribution curve of a blade surface of a suction side, which excludes the leading edge portion and a trailing edge portion of said blade, has two curvature maximums.
Lines 49-55, should read:
4.    A turbine moving blade having a maximum blade load point on a trailing edge side, wherein a blade profile is formed such that a pressure distribution curve of a blade surface of a suction side of the moving blade, excluding a leading edge portion and a trailing edge portion, drops in two stages in an area from the leading edge to a minimum pressure point.

Column 10,
Lines 39-45, should read:
9.    A turbine blade operated by working fluid, wherein when a blade loading distribution curve is defined by a blade load of each position on a blade surface of the moving blade, the area from a leading edge to a maximum blade load position of a curve portion of the blade loading distribution curve, excluding the leading edge portion and a trailing edge portion, is divided into two portions.

This certificate supersedes Certificate of Correction issued March 22, 2005.

Signed and Sealed this

Nineteenth Day of July, 2005

JON W. DUDAS
*Director of the United States Patent and Trademark Office*